April 19, 1966  C. W. VEACH  3,246,508
MILES PER GALLON METER
Filed Sept. 10, 1962  2 Sheets-Sheet 1
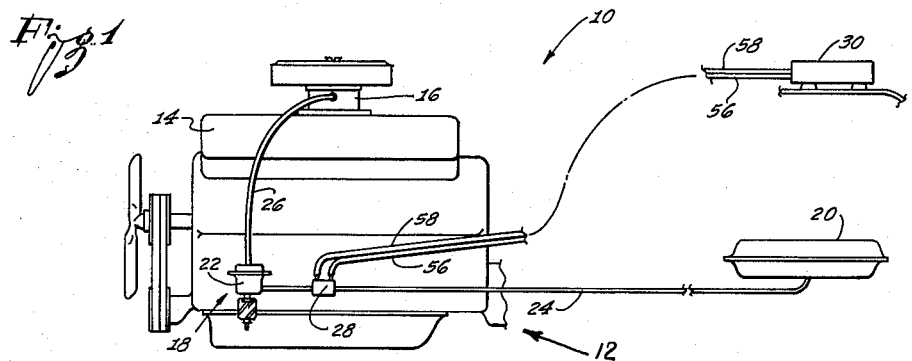
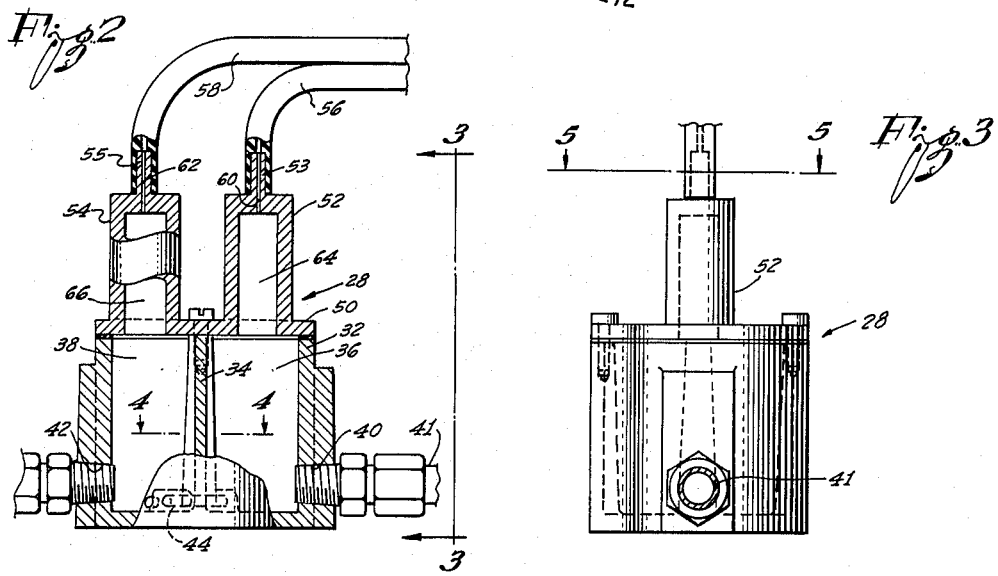
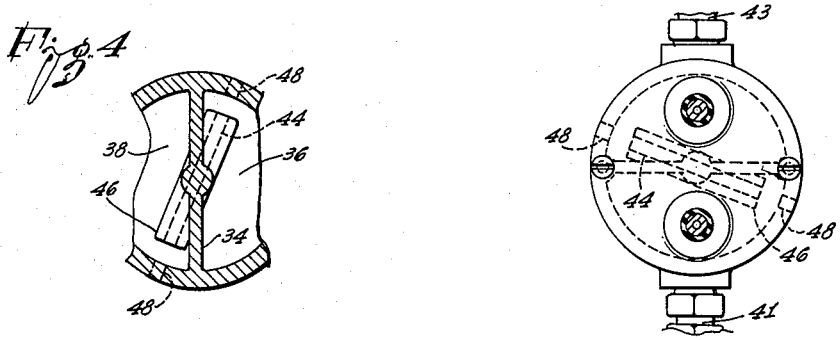
INVENTOR:
Carlos W. Veach
By Smyth, Roston & Pavitt
Attorneys April 19, 1966 C. W. VEACH 3,246,508
MILES PER GALLON METER
Filed Sept. 10, 1962 2 Sheets-Sheet 2
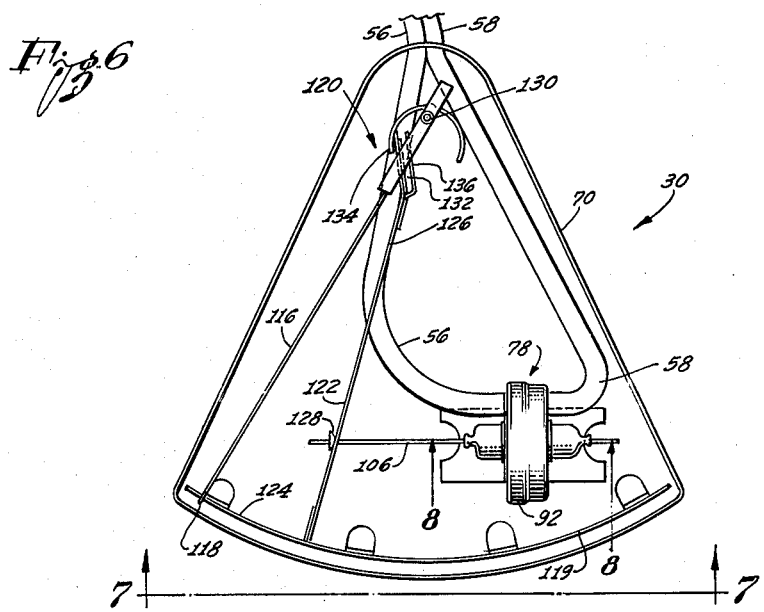
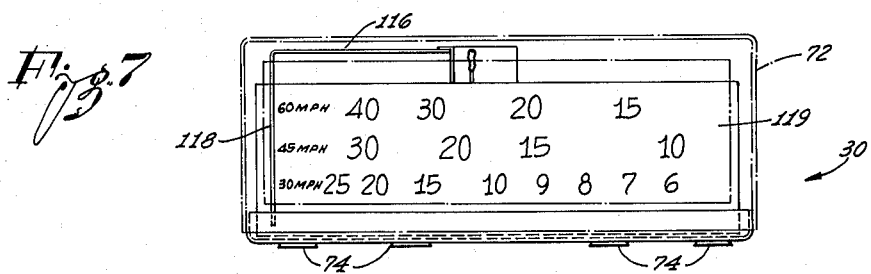
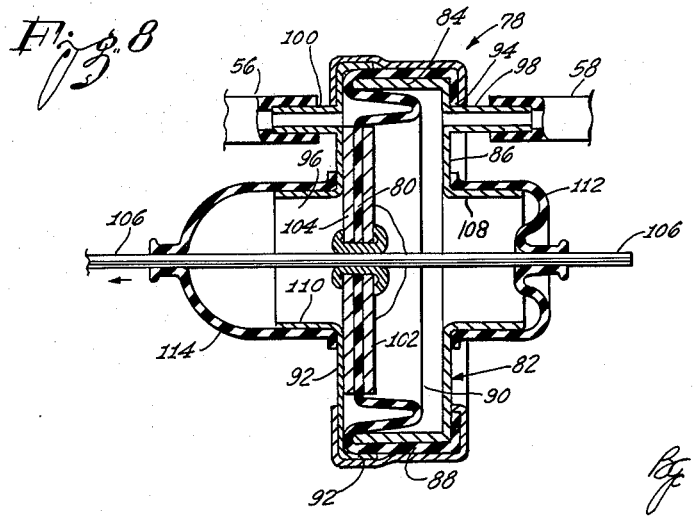
INVENTOR:
Carlos W. Veach
Attorneys

United States Patent Office 3,246,508
Patented Apr. 19, 1966

3,246,508
MILES PER GALLON METER
Carlos W. Veach, 8921 Ashcraft,
Los Angeles 48, Calif.
Filed Sept. 10, 1962, Ser. No. 223,299
5 Claims. (Cl. 73—114)

The present invention relates to means for continuously indicating the instantaneous rate of fuel consumption of an engine and, more particularly, to means for continuously indicating the distance that a vehicle is travelling on a given quantity of fuel.

Heretofore, when it has been desirable to determine the distance such as miles that an automotive vehicle travels on a given quantity of fuel, such as a gallon, it has been customary to employ a burette or other measuring device which will permit feeding measured quantities of fuel into the engine while the vehicle travels over a measured distance. Although such a method can provide an accurate measure of the miles per gallon, it is a complicated and time-consuming operation. The accuracy of the results are dependent upon the ability of an operator to maintain constant operating conditions throughout the test period and to accurately measure all of the various facts such as distance and fuel flow. In addition, the results are not instantly available and only indicate the average fuel consumption over some extended test interval. As a result, the use of such systems have been confined to experimental testing and similar types of usage.

It is now proposed to provide an instrument for indicating the miles per gallon obtained from an automotive vehicle which overcomes the foregoing difficulties. More particularly, it is proposed to provide an instrument for continuously indicating the instantaneous amount of miles per gallon being obtained from the vehicle which is not only simple and inexpensive, but is easy to use. This is to be accomplished by employing a transmitting portion which may be disposed in the fuel line for developing signals proportional to the instantaneous rate of fuel flow and a receiving unit which is responsive to the signals and is positioned so as to be observable by the operator and is calibrated for indicating the distance the vehicle is travelling on a given quantity of fuel. More particularly, the transmitting unit includes a calibrated restriction that will be effective to produce a pressure drop proportional to the rate of fuel flow. It also includes a pair of chambers that are effective to form air pockets whereby pair of pneumatic signals will be provided that have a pressure differential proportional to the rate of fuel flow. The receiver unit includes a pressure-responsive device that will sense this pressure differential and an indicator portion that is calibrated to effectively indicate the distance the vehicle is travelling on a given quantity of fuel.

These and other features and advantages of the present invention will become readily apparent from the following detailed disclosure of one embodiment of the invention, and particularly when taken in connection with the accompanying drawings wherein like reference numerals refer to like parts, and wherein:

FIGURE 1 is a schematic view of an internal combustion engine with a fuel a system that includes an indicating means embodying the present invention;

FIGURE 2 is a cross-sectional view of a transmitting unit employed in the indicating means of FIGURE 1;

FIGURE 3 is an end view of the transmitting unit of FIGURE 2;

FIGURE 4 is a fragmentary cross-sectional view of the transmitting unit taken substantially along the plane of line 4—4 of FIGURE 2;

FIGURE 5 is a plan view of the transmitting unit of FIGURE 2;

FIGURE 6 is a plan view of the indicating unit suitable for use in the system of FIGURE 1;

FIGURE 7 is a front view of the indicating unit of FIGURE 6; and

FIGURE 8 is a transverse cross-sectional view of the pressure-responsive transducing unit employed in the indicating unit of FIGURES 6 and 7.

Referring to the drawings in more detail, the present invention is particularly adapted to be embodied in an indicating system 10 for measuring and indicating the distance that a vehicle is travelling on a given quantity of fuel. For example, the system 10 may indicate the miles-per-gallon, kilometers-per-liter, etc., that an automobile 12 is obtaining. More particularly, the present system 10 is primarily intended for use on an automobile driven by means of an internal combustion engine 14. This engine 14 may include a carburetor 16 which receives fuel from a fuel system 18 and mixes it with air to form a combustible mixture. This fuel system 18 includes a fuel storage tank 20, a fuel pump 22 and a fuel line having a section 24 which extends from the fuel tank 20 to the fuel pump 22 and a section 26 that extends from the fuel pump 22 to the carburetor 16. The fuel pump 22 may be operatively interconnected with the engine 14 so as to be driven thereby. The fuel pump 22 will be effective to receive fuel from the section 24 at a pressure that will be substantially equal to atmospheric pressure or in a range of approximately one pound per square inch above or below atmospheric pressure. The pump 22 will then discharge the fuel into the section 26 at a pressure in the range of three to five pounds per square inch.

The measuring or indicating system 10 includes a transmitting unit 28 disposed in the fuel line and a receiving or indicating unit 30 disposed inside of the vehicle so as to be visible to one or more of the occupants of the vehicle.

The present transmitting unit 28 includes a rigid housing 32 that may be cast out of aluminum or similar metal so as to have a substantially cylindrical shape. This housing 32 may include a substantially cylindrical compartment on the inside thereof. A partition 34 extends diametrically across the interior of the housing 32 and divides the compartment into an input chamber 36 and an output chamber 38. An opening 40 may extend through a side wall of the housing 32 so as to open into the input chamber 36 immediately adjacent the bottom thereof. Thus, section 24 of the fuel line may have a part 41 connected into the opening 40 such that the fuel flowing from the fuel tank 20 may flow directly to the input chamber 36 and form a puddle of fuel which will occupy the lower portion of the chamber 36.

In addition, a passage 42 may extend through a side wall of the housing 32 so as to open into the bottom of the output chamber 38. The section 24 of the fuel line may have a port 43 that extends from the passage 42 to the fuel pump 22 whereby fuel may flow directly from the bottom of the chamber 38 to the fuel pump 22.

The input and output chambers 36 and 38, respectively, are interconnected with each other so as to permit the fuel to flow therethrough. This interconnection preferably includes a restriction that will be effective to permit the fuel to flow freely between the chambers 36 and 38 but will have a sufficient hydraulic resistance to cause a pressure differential to be created thereacross proportional to the volume of flow therethrough. Although the resistance may be in the form of an orifice or the equivalent, it has been found preferable to employ an elongated passage 44 having a restricted diameter. In the present instance, this passage 44 is formed by drilling diametrically through the housing 32 so as to pass axially through the enlarged boss 46. The ends of the passage in the side walls of the housing may then be closed by suitable plugs 48 pressed therein. As a result of the restriction formed by this passage 44, the pressure differential between the opposite ends thereof will be a function of the quantity of fuel which is flowing through the fuel line. In order to minimize interference with the flow of fuel and the possibilities of vapor lock, the restriction of the passage 44 must be low. Because of the small quantities of fuel that normally flow through the fuel line, the pressure differential across the passage will be on the order of .06 pound per square inch. Since this will correspond to a head of two inches of a fuel such as gasoline, the fuel levels in the two chambers 36 and 38 should be as close as possible to the same heights. Accordingly, the horizontal cross-sectional area of the two chambers 36 and 38 should be sufficiently large to permit the normal differences in the volumes of fuel in the two chambers to occur without producing material differences in the static level of the fuel in the chambers 36 and 38.

A cover member 50 may be secured to the end of the housing 32 so as to close the two chambers 36 and 38 and seal them from the atmosphere. Thus, the pressure differential produced by the flow of fluid through the restricting passage 44 will be present in the upper portions of the chambers 36 and 38. In order to permit the sensing of these two pressures, outlets 52 and 54 may be provided in the cover 50 which communicates with each of the chambers 36 and 38. In the present instance, each of these outlets 52 and 54 includes small cylindrical extensions 53 and 55 having an outside diameter such that rubber hoses 56 and 58 or similar device may be secured onto the ends thereof. Restricted passages 60 and 62 may extend through the extensions so as to communicate between the hoses and the chambers 36 and 38. It has been found that where the fuel system is employed on a moving vehicle such as an automobile, the vibrations and accelerations of the vehicle will cause the fuel present in the chambers 36 and 38 to splash and gyrate around. This fuel may tend to enter into the outlets 52 and 54 and become lodged in one or the other of the passages 60 and 62 or the rubber hoses 56 and 58 so as to block the system. To prevent this anti-splash chambers 64 and 66 may be provided at the tops of the input and output chambers 36 and 38. Each of these chambers 64 and 66 has a substantially cylindrical shape and projects upwardly from the chambers 36 and 38. Preferably, these anti-splash chambers have diameters which are substantially smaller than the corresponding areas of the chambers 36 and 38. As a result, in the event that any of the fuel splashes around the upper portions of the chambers 36 and 38, it will normally strike the wall and be returned to the bottoms of the chambers without entering the splash chambers 64 and 66. However, in the event some of the fuel should enter one or the other of the chambers 64 and 66, it will be highly unlikely to travel sufficiently high to enter the passages 60 and 62. Due to the large size of the chambers 64 and 66, there will be no capillary action, etc., which would retain the fuel therein. As a consequence, the fuel will be immediately returned to the bottom of the chambers 36 and 38 and be prevented from entering the passages 60 and 62.

The receiving or indicating unit 30 may be particularly adapted to be mounted in a position where it can be readily observed by the operator of the vehicle. The present indicating unit 30 includes a base 70 upon which the operative elements of the unit 30 may be mounted. In addition, an outer cover 72 may be secured to the base so as to enclose and protect the operative elements. To facilitate mounting the unit 30 in the vehicle, a plurality of magnetic rubber feet 74 may be secured to the bottom of the base 70. As a result, by merely placing the unit 30 on a metallic member such as the instrument panel 76, the feet 74 will be attracted thereto whereby the unit 30 will be clamped in a fixed position.

In order to sense the pressure differential produced at the transmitting unit 28 and present between the hoses 56 and 58 a suitable pressure-responsive transducer may be disposed in the unit 30. Although any suitable type of transducer may be employed, in the present instance it has been found desirable to provide a transducer 78 having a diaphragm 80 therein. By employing a diaphragm, it is possible to provide a sufficiently large area to the pressure differential to produce adequate working force from the small pressure differentials produced by the transmitting unit 28.

The transducer 78 includes a housing 82 with a portion having a cylindrical exterior 84 and with a wall 86 that extends transversely across the end of the housing 82. A flexible diaphragm 80 may be provided across the open end of the housing 82. In order to secure the diaphragm 80 in position, the periphery may include a substantially cylindrical portion 88 that may be stretched over the exterior 84 of the housing 82. In addition, a rim or lip section 94 may be provided which fits over the end wall 86. It may thus be seen that the diaphragm will be effective to enclose and seal a chamber 90 inside of the housing 82. A cover 92 may also be provided that fits over the outside of the cylindrical portion 88 so as to be sealed thereon. Thus, a second chamber 96 will be formed on the side of the diaphragm 80 opposite from the chamber 90. In order to insure a more effective seal, a band may be provided around the exterior of the cover 92 and the portion 88 that will contract radially inwardly and compress the portion 88 against the cover 92.

It may thus be seen that the diaphragm 80 will be effective to divide the space between the cap or cover 92 and the housing 82 into two pneumatically separate chambers 90 and 96 such that the pressures in the two chambers 90 and 96 will be effective to operate against the opposite sides of the diaphragm 80. In order to permit the pressure differentials developed at the transmitting unit 28 to be introduced into these chambers 90 and 96, a pair of tubular fittings 98 and 100 may be provided for having the ends of the hoses 56 and 68 attached thereto.

To insure the diaphragm having sufficient rigidity to be responsive to the pressure differential between the two chambers 90 and 96, a pair of backing plates 102 and 104 may be secured to the opposite sides of the diaphragm 80 so as to compress the diaphragm therebetween. As a result, the pressure differential may effectively act against the entire area of the backing plates 102 and 104 and produce a substantial force thereon that will tend to move the diaphragm in one direction or the other.

In order to permit the backing plates 102 and 104 and the diaphragm therebetween to move, an annular region extending around the periphery of the backing members and adjacent the interior of the housing 82 may be formed into a flexible convolution which will provide little restraint so that the backing plates may respond freely to the very low pressure differentials.

In order to sense the motion of the diaphragm 80 and backing plates 102 and 104 as they travel axially of the housing 82, a shaft 106 may be secured to the backing plates 102 and 104 so as to project from the opposite sides thereof. The opposite ends of this shaft extend through the openings 108 and 110 in the end wall 86 and the cover 92. In order to provide an hermetic seal for preventing the loss of pressure inside of the chambers 90 and 96, a pair of sealing diaphragms 112 and 114 may be provided which encompass the openings 108 and 110 in the cap and housing and are secured to the shaft 106. Since these diaphragms 112 and 114 are very flexible, they will permit the shaft 106 to move axially. At the same time, the diaphragms 80, 112 and 114 will tend to support the shaft 106 against lateral movement.

It may be seen that the pressure chambers 90 and 96 will be effectively sealed from the atmosphere and will contain the pressure developed across the passage 44. This pressure differential will produce a force on the diaphragm proportional to the rate of fuel flow that will cause the diaphragm to tend to move axially with the shaft 106. Since the backing members 102 and 104 and shaft 106 are all supported by the resilient diaphragms 80, 112 and 114, there will be very little hysteresis and/or friction that will materially impair the accuracy with which this force moves the diaphragm.

In order to provide a visual indication of the amount of force acting on the diaphragm, a suitable indicator may be provided. The present indicator includes a lever member 116 having a thin portion 118 such as a needle that projects across the face of an indicator card 119 so as to be free to travel across the face of the card 119 and register with various indicia provided thereon. In the present instance, this lever member 116 is interconnected with the shaft 106 by means of a linkage 120 which will be effective to position the portion 118 in proportion to the amount of force exerted across the diaphragm 80. This linkage 120 includes a resiliently deflectable spring member 122. One end of this member 122 is rigidly secured so that the spring member will function as a cantilever. Although the spring may be secured to any suitable support, it has been found desirable for the spring 122 to be secured to the back 124 for supporting the indicator card 119. The spring extends past the shaft 106 in the transducer 78. The shaft 106 is secured to the spring 122 by extending through an opening in the spring member 122. A contact member 128 having a spherical surface thereon may engage the spring to provide a substantially friction-free connection therewith. Normally, the spring member 122 will be tensioned to produce a biasing force which will tend to move the shaft 106 and diaphragm 80 toward the high pressure chamber 96. Thus, the presence of a higher pressure in the chamber 96 will be effective to move the diaphragm 80 against the tension of the spring 122.

The outer end 126 of the spring member 122 projects beyond the shaft 106 by a substantial distance. As a result, any deflections of the spring member 122 produced by the shaft 106 pulling on the spring 122 will produce a greatly amplified amount of motion at the end 126.

The lever member 116 may be mounted on a pin 130 that is secured to the base 70 substantially concentric with the axis of the back 124 and the card 119. The pin 130 is also preferably disposed close to the periphery of the area swept by the end 126 of the spring member 122. The lever is pivotally mounted on the pin 130 so as to be free to rotate about its axis. The portion 118 of the member 116 that projects around the edge of the back 124 and across the card 119 will thus act as a marker which will register on the card 119. Moreover, as the lever swings about the axis of the pin 130, the marker portion will sweep across the face of the card 119.

In order to interconnect the lever member 116 with the spring member, a pin 132 may be provided which projects down from the lever 116 so as to engage a portion of the spring 122 and ride thereagainst. It may thus be seen that as the end 126 of the spring 122 tends to move the right (as seen in FIGURE 6) it will bear against the pin 132 and rotate the lever 116 such that the portion 118 will move to the right (as seen in FIGURES 6 and 7).

In order to insure continuous contact between the pin 132 and the spring 122, a magnetic member 134 such as a piece of magnetic rubber may be secured to the spring 122 so as to attract the pin 132. This will insure the pin 132 being retained against the member 134 while still permitting a sliding movement therebetween. In addition, it has also been found desirable to provide a guard ring 136 on the spring 122 which extends around the pin 132. This guard ring 136 will normally be spaced from the pin 132 as long as it engages the member 134. However, in the event the spring should suddenly move away from the pin 132, the guard ring 136 will be effective to insure the pin being retained sufficiently close to the magnetic member 134 to be attracted thereagainst.

It may be seen that an indicating system has been provided which will be effective to indicate the rate that an engine is consuming fuel and/or the distance that a vehicle is travelling on a given quantity of fuel. In order to employ the present system 10, the transmitting unit 28 is placed in the fuel line. Although this unit may be in the section 26 between the fuel pump 22 and carburetor, it has been found that this fuel flow tends to pulse and also has a pressure that may be so high as to make it very difficult to accurately detect the small pressure drop produced across the passage 44. It is, therefore, preferable to place the transmitting unit 28 in a section 24 of the fuel line having very low pressures. Once the section 24 has been interconnected by fastening the ends 41 and 43 in the openings 40 and 42, the hoses 56 and 58 may be interconnected with the receiving unit 30 in the vehicle.

After the system 10 has been installed as described above, if the engine 14 is running such that the pump 22 is drawing fuel through the transmitting unit, a pressure drop will be produced across the passage 44 that will be a function of the quantity of fuel flow.

The air in the upper portions of the chambers 36 and 38 will reflect this pressure drop and, accordingly, will have a pressure differential therebetween that is proportional to the fuel flow. Their two pressures will be transmitted through the hoses 56 and 58 to the chambers 90 and 96. This will produce a force of corresponding amplitude which will cause the shaft 106 to deflect the spring 122. When the spring 122 is deflected, the diaphragm will move and cause air to flow out of or into the chambers 90 and 96. This air will then flow through the hoses to the chambers 36 and 38. This will produce a displacement of an equal volume of fuel in the chambers 36 and 38. However, since the horizontal cross-sectional area of the chambers 36 and 38 is large, the changes in the volume of fuel will not produce an excessive difference between the levels of fuel in the two chambers. As a result little, if any, error will be produced from this effect.

The deflection of the spring 122 will cause the lever 116 to swing about the pin 130 and move across the face of the card 119. The card 119 may have a plurality of indicia thereon which correspond to various speeds. For example, one row may correspond to say 30 miles per hour while other rows correspond to 45 miles per hour. Accordingly, if an operator desires to know the miles per gallon that he is obtaining, he may observe the value of the indicia that the portion 118 registers with in the row corresponding to the speed at which the vehicle is travelling.

It may thus be seen that a measuring system has been provided for continuously indicating the instantaneous distance that a vehicle is travelling on a given quantity of fuel. Although only a single embodiment has been illustrated, it will be readily apparent to persons skilled in the art that numerous changes and modifications may be made thereto without departing from the scope of the invention. Accordingly, the foregoing disclosure is for illustrative purposes only and does not limit the invention which is defined only by the claims that follow.

What is claimed is:

1. A system for measuring the flow of fuel to an engine comprising the combination of:
   a fuel supply tank,
   a fuel line extending from the tank to the engine,
   a fuel pump in said fuel line for forcing fuel from the tank to the engine,
   a housing having an input chamber and an output chamber interconnected with said fuel line between the fuel pump and the supply tank,
   a metering restriction for interconnecting said chambers with each other to allow fuel to flow between the chambers, said restriction creating a pressure differential between said chambers which is a function of the fuel flow through said fuel line,
a pressure-responsive device having a movable member that is operatively interconnected with an indicator for moving the indicator across a scale, and
means for interconnecting said pressure-responsive device with said chambers for exposing the opposite sides of said movable member to the pressures in said chambers.

2. A system for measuring the flow of fuel through a fuel line to an engine, said system comprising the combination of:
a housing having an input chamber with a lower portion for being interconnected with an upstream portion of said fuel line for receiving fuel therefrom and having an output chamber with a lower portion for being interconnected with a downstream portion of said fuel line for returning said fuel thereto,
a metering restriction disposed in said housing for interconnecting said chambers with each other for creating a pressure differential between said chambers which is a function of the fuel flow through said fuel line,
a pressure-responsive device having a movable member that is operatively interconnected with an indicator for moving said indicator across a scale, and
means for interconnecting said pressure-responsive device with said housing for exposing the opposite sides of said movable member to the pressures in said chambers to cause said member to move in response to the pressure differential thereacross, the horizontal areas of said lower portions being relatively large compared to the effective area of said movable member.

3. A system for measuring the flow of fuel through a fuel line to an engine, said system comprising the combination of:
a housing having an input chamber with an upper portion of reduced area and a lower portion of increased diameter for being interconnected with said fuel line for receiving fuel therefrom and having an output chamber with an upper portion of reduced area and a lower portion of increased diameter for being interconnected with said fuel line for returning said fuel thereto,
a metering restriction in said housing interconnecting said chambers with each other for creating a pressure differential between said chambers which is a function of the fuel flow through said fuel line,
a pressure-responsive device having a movable member that is operatively interconnected with an indicator for moving said indicator across a scale, and
conduit means for interconnecting said pressure-responsive device with said housing for exposing the opposite sides of said movable member to the pressures in said chambers, the horizontal cross-sectional area of said lower portions being relatively large compared to the effective area of said movable member, the horizontal cross-sectional area of said upper portions being less than said area of said lower portion but greater than the cross-sectional area of said conduit means.

4. Means for producing a pair of pressure signals having a pressure differential that is a function of the quantity of fluid flowing through a conduit and is effective to actuate a pressure-responsive device, said means comprising the combination of:
a housing having an input chamber for being interconnected with an upstream portion of said conduit for receiving a fluid therefrom and having an output chamber for being interconnected with a downstream portion of said conduit for returning said fluid to said conduit, and
an interconnection extending between said chambers to permit the flow of fluid therebetween, said interconnection having a restriction that produces a pressure differential between said chambers that is a function of the quantity of flow through said interconnection, the upper portions of each chamber having an outlet for being interconnected with said pressure-responsive device for supplying said pressure signals thereto, each of said upper portions forming a splash compartment having a cross-sectional area greater than the area of said outlet but smaller than the area of the remaining portions of said chambers.

5. Means for producing a pair of signals having a pressure differential that is a function of the quantity of fluid flowing through a conduit and is effective to actuate a pressure-responsive device, said means comprising the combination of:
a housing having an input chamber and output chamber for being interconnected with said conduit, and
an interconnection extending between said chambers to permit the flow of fluid therebetween, said interconnection having a restriction that produces a pressure differential between said chambers that is a function of the quantity of flow through said interconnection, the portions of said chambers containing said fluids having a sufficiently large cross-sectional area compared to the effective area of said pressure-responsive device to prevent the movement of said pressure-responsive device producing a material difference between the levels of the fluids therein, the upper portions of each chamber having an outlet for being interconnected with one side of said pressure-responsive device, said upper portions having a cross-sectional area that is greater than the area of said outlet but is smaller than the area of the lower portion of said chambers.

References Cited by the Examiner
UNITED STATES PATENTS

| | | | |
|---|---|---|---|
| 213,467 | 3/1879 | Storer | 73—502 |
| 1,552,119 | 9/1925 | Davis | 73—114 |
| 1,556,910 | 10/1925 | Cabot | 73—205 |
| 1,579,536 | 4/1926 | Hodgson | 92—100 |
| 1,641,295 | 9/1927 | Schroeder. | |
| 1,684,014 | 9/1928 | Dudley | 73—211 X |
| 2,275,712 | 3/1942 | Zand | 92—100 |
| 2,306,940 | 12/1942 | Fischer | 73—211 |
| 2,310,546 | 2/1943 | Robinson | 73—205 |
| 2,723,565 | 11/1955 | Griest | 73—432 |
| 2,796,762 | 6/1957 | Touchman | 73—114 |
| 3,094,002 | 6/1963 | Ryan et al. | 73—432 |

RICHARD C. QUEISSER, *Primary Examiner.*

JOSEPH P. STRIZAK, *Examiner.*